Figure 1:
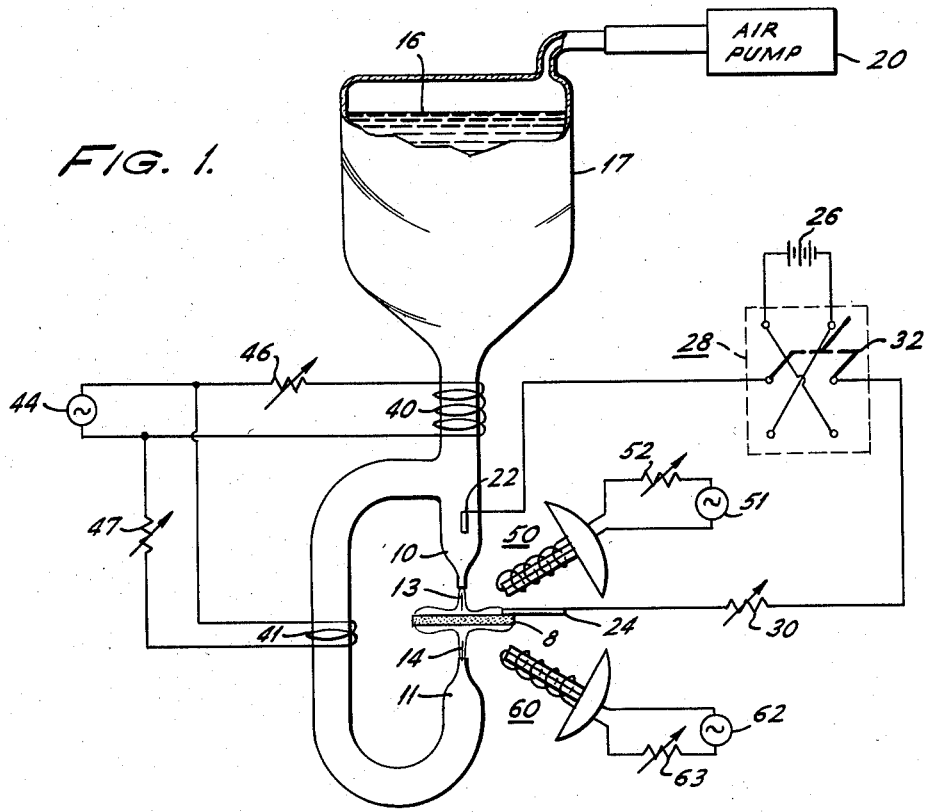

July 19, 1960 R. A. WILLIAMS 2,945,789
METHOD FOR FABRICATING METAL-SEMICONDUCTOR ALLOYED REGIONS
Filed Nov. 25, 1955

INVENTOR.
RICHARD A. WILLIAMS
BY
ATTORNEY

United States Patent Office 2,945,789
Patented July 19, 1960

2,945,789

METHOD FOR FABRICATING METAL-SEMICONDUCTOR ALLOYED REGIONS

Richard A. Williams, Collingswood, N.J., assignor to Philco Corporation, Philadelphia, Pa., a corporation of Pennsylvania Filed Nov. 25, 1955, Ser. No. 549,062

7 Claims. (Cl. 204—15)

This invention relates to methods for the production of metal-semiconductor alloy regions in bodies of semiconductive material, and particularly to processes for the fabrication of P-N junctions of accurately-controlled locations and configurations in such bodies.

Methods are known in the prior art for producing controlled alloying between a metal and a semiconductive body by applying the metal to the surface of the semiconductive body in the location in which the alloy region is to be produced, heating the two materials, while holding them substantially in their original relative positions, until alloying occurs, and then cooling the assembly to produce the desired solid region of alloy. For example, in one method commonly employed for this purpose, a small pellet of a metal of a suitable size and configuration may be applied to a preselected location on a semiconductive surface, and confined to this location while being heated to a temperature sufficient to permit the desired alloying with the semiconductor. Such a method, in one form, is described in the copending application Serial No. 505,390 of Albert D. Rittmann, filed May 2, 1955, and entitled "Method of Fusing Metal Body to Another Body." Also it is known to provide metallic deposits upon semiconductive bodies by means of the jet-electrolytic plating method described in the copending application Serial No. 472,824 of John W. Tiley and Richard A. Williams, filed December 3, 1954, and entitled "Semiconductive Devices and Methods for the Fabrication Thereof," and to heat the resultant metal-semiconductor assembly to produce an alloyed region, and after cooling a P-N junction, in the desired location.

While such methods are suitable for many purposes and have been employed successfully in fabricating devices of a variety of kinds, they are inherently somewhat complicated in requiring each of the intermediate steps of careful application of the metallic material in the proper location and configuration, subsequent controlled heating of the assembly in a suitable apparatus for a controlled time to produce alloying, and maintenance of the desired geometric relationship between the metal and the semiconductor after the metal has melted and during the alloying process.

Accordingly, it is an object of my invention to provide an improved method for the production of metal-semiconductor alloy regions in semiconductive bodies.

Another object is to provide such a method which may be performed more simply and more quickly than previous methods.

A further object is to provide, simply and quickly, a P-N junction of controlled configuration and location in a body of semiconductive material.

It is a still further object to provide an improved method for the fabrication of junction-type diodes, which is especially simple and quick to perform.

Yet another object is to provide a new method for the fabrication of transistor devices employing a pair of opposed P-N junctions.

In accordance with the invention, a metal-semiconductor alloy region is produced in a body of semiconductive material by jet-electrolytically depositing, upon a surface of the body, ions of the metals to be alloyed with the semiconductor, while maintaining the interface between the jet and the body at a temperature sufficiently high to produce substantial alloying between the metal and the semiconductor; ordinarily this temperature will be at or above the eutectic temperature for an alloy of the metal and the semiconductor, and preferably is above the melting point of the metal. Under these conditions, simultaneous deposition and alloying of the metal with the semiconductor occurs. When the desired size of deposit has been produced, the electrolytic current is reduced or discontinued entirely, and the temperature of the interface is reduced below the eutectic temperature as soon as the desired degree of alloying has occurred, which may be at the same time as the reduction of the current, or at an earlier or later time, depending upon the depth of alloying desired.

Preferably, the electrolyte is such that the decomposition temperature of the solvent employed lies above the melting point, or at least above the eutectic temperature, of the metal employed. Preferably also, the semiconductive body is heated during the plating process by auxiliary means, which in some cases may contribute toward maintaining the desired high temperature at the interface between deposited metal and semiconductor.

By this process, the desired alloy region is formed in the region where the jet impinges the semiconductive material. When the metal applied is of a type to alter the conductivity of the semiconductive body, the resultant structure, after cooling and recrystallization of the semiconductor, comprises a junction such as may be utilized as a diode rectifier, or for other purposes in semiconductive devices. In particular, it may be utilized as the collector, or in some cases as the minority-carrier emitter, in a transistor of the junction type; or a pair of such opposed junctions may be fabricated simultaneously on opposite surfaces of a semiconductive body to produce emitter and collector simultaneously. Furthermore, by providing appropriate relative motion between the body and the jet, as described for example in the above-mentioned copending application of Tiley and Williams, any of many desired configurations of emitted and/or collector junction may be produced at will.

In contrast to the methods of the prior art described hereinabove, the present procedure effects application, localization and alloying simultaneously, where the prior art requires a sequence of steps. The process is therefore particularly quick in fulfillment, and especially adapted for rapid production of alloy devices of many kinds.

Other objects and features of the invention will be more readily understood from a consideration of the following detailed description, taken in conjunction with the accompanying drawings, in which:

Figure 1 is a representation, partly in section and partly diagrammatic, of apparatus suitable for practising the invention in one form thereof; and Figures 2A, 2B, 2C and 2D are sectional views, showing a semiconductive structure in successive stages of fabrication in accordance with one form of the invention.

Considering now in detail the apparatus shown in Figure 1, the semiconductive body 8 is located between the two jet-forming nozzles 10 and 11, so as to be impinged at opposed surface regions by the corresponding two electrolytic jets 13 and 14. Electrolyte 16 is supplied to the two nozzles, which may be of glass, from a suitable reservoir 17 by way of appropriate interconnecting glass tubing. While in some instances gravity flow of the electrolyte may be relied upon entirely, it is preferred to insure adequately rapid and substantially constant jet flow by applying a small amount of air pressure to the upper surface of the liquid in reservoir 17, by means of a suitable air pump 20.

To provide the desired electrolytic current, an inert electrode 22 is immersed in electrolyte 16, and an ohmic base connection 24 is provided to the semiconductive body 8, a suitable potential then being applied between electrode 22 and contact 24 from potential source 26 by way of double-pole, double-throw switch 28, which serves to permit reversal of the direction of the applied voltage. A variable resistance 30 may also be employed in series with the electrolytic current path, to permit control of the magnitude of the current.

More specifically, electrode 22 is connected to one of the arm contacts of switch 28, while ohmic contact 24 is connected to the other arm contact by way of the variable resistor 30. With the arm 32 of switch 28 in the upper position, the body 8 is made negative with respect to the electrolyte, so as to produce a strong tendency for electrodeposition of metal ions onto the region impinged by the jets, while, with the arm in the downward position, the body is positive with respect to the electrolyte so as to provide a strong tendency for etching of the semiconductive material in the region impinged by the jets.

The portion of the apparatus of Figure 1 thus far described is therefore effective to permit jet-electrolytic etching and plating of the semiconductive body 8 in the general manner described in the above-cited application of Tiley and Williams. In addition, there are provided means for heating the electrolyte and the semiconductive body to a controlled temperature, so as to produce a temperature suitable for alloying at the electrolyte-semiconductor interface. In the arrangement shown, the apparatus for providing heating of the electrolyte comprises a pair of radiant-type heating coils 40 and 41, surrounding portions of the electrolyte-supplying apparatus situated just ahead of nozzles 10 and 11, respectively, each of which coils may be supplied with an alternating current from any suitable source, such as a 110-volt A.C. line, represented generally as generator 44. Variable resistors 46 and 47 may be provided in series with coils 40 and 41, respectively, to permit independent control of the magnitude of the heating effects exerted thereby. By a suitable adjustment of these resistors, the temperature of the electrolyte from nozzle 10 may be made equal to, higher than, or lower than, that of the electrolyte emanating from nozzle 11, whichever may be desired in the particular application. Similarly, the upper surface of the semiconductor wafer 8 may be heated to any desired extent by means of radiant heater 50, supplied with current from any suitable source 51 by way of a current-controlling, variable resistor 52, and arranged to concentrate its heat radiation upon the upper surface of body 8. A similar arrangement, comprising the radiant heater 60, may be arranged to direct its heat radiations against the under-surface of the body 8, and may be supplied with current from a suitable source 62 by way of the current-controlling resistor 63.

Turning now to the nature of the electrolyte which is impinged upon the semiconductor, and the temperatures of electrolyte and semiconductor maintained during impingement, these factors are controlled by the requirement that the electrolyte provide a metal deposit which will alloy with the semiconductor substantially immediately upon deposition. In the preferred embodiment, the metal ion is of an element having a melting point below the decomposition temperature of the solvent in which it is dissociated, and both the electrolyte and the semiconductive surface are maintained at a temperature above the melting point of the metal element chosen but below the decomposition temperature of the solvent. With this arrangement, the desired alloyed regions of controlled configuration are provided in the regions impinged by the jets, by applying the jets to these regions and passing the electric current through the jets in the direction to accomplish plating, i.e. arm of switch 28 in its upper position. When the desired amount of metal has been thus deposited, the application of metal may be terminated by discontinuing the electric current, or by removing the jets from the body. When the desired amount of alloying between the semiconductor and the metal has occurred, the temperature of the alloyed region is reduced below the eutectic temperature, as by discontinuing the heating currents or removing the body from the influence of the warm electrolyte and/or radiant heaters. After such cooling, the desired alloyed region will have been formed, and where the metal and body are of suitable types, a P-N junction providing current rectification, or even minority-carrier injection, will have been provided, as described in more detail hereinafter.

Considering next the factors affecting the choice of the several parameters of the system in various applications of the method, where smooth plating and a smooth boundary for the alloyed region are desired, as above mentioned the metal should be such that its eutectic with the semiconductor is below the temperature of decomposition of the solvent utilized in the electrolyte, so that the temperature of the electrolyte may be maintained above the eutectic temperature but below the decomposition temperature; the process may then be conducted without concurrently decomposing the electrolyte. As to the extent of auxiliary heating of the semiconductive body by means other than the jets, this depends in part upon the exact relationship of the temperature of the electrolyte to the eutectic temperature. Thus, when the temperature of the electrolyte is only very slightly above the eutectic temperature, the semiconductive body is preferably itself heated at least to the eutectic temperature, lest it exert cooling effects sufficient to reduce the temperature at the interface below the eutectic temperature. On the other hand, in some cases the auxiliary heating may maintain the temperature at the interface sufficiently high that, even though the electrolyte in the reservoir is slightly below the eutectic temperature, the metal deposited upon the semiconductor is heated well above the eutectic point substantially immediately upon deposition. As to the relative temperatures employed at the interfaces on the opposite sides of the blank in the double-jet form of the invention, these temperatures may be made substantially identical where substantially identical degrees of alloying are desired on the two sides, but it will be understood that they may be caused to differ, as by appropriate adjustment of variable resistors 46 and 47, where a different rate of alloying is desired on one side than on the other.

In applying the process of the invention in various applications, the jet may be applied and the electrolytic current passed concurrently, beginning at the same time and terminating at the same time; or the jet may be applied first without electrolytic current, with the electrolytic current applied later; or jet impingement and current flow may be initiated simultaneously, with the current being terminated first, depending upon the exact effects desired. It will be understood that the effect of applying the hot jet without the passage of electrolytic current through it is to provide a preliminary warming of the semiconductor before electrodeposition, or to provide a prolonged, additional heating effect upon the deposited metal after deposition is completed, so as to effect further alloying.

Figure 2A:
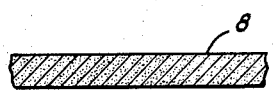
Figure 2B:
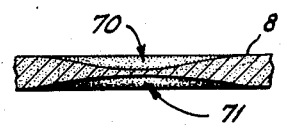
Figure 2C:
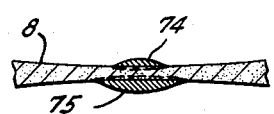

The manner of application of the above-described general procedure, as it may be applied in the fabrication of transistors, will now be described with particular reference to Figure 2. In Figure 2A, the portion of body 8 shown represents that to be subjected to electrolytic treatment, as it appears when first placed between the nozzles 10 and 11. Initially, opposite surfaces of the body 8 are substantially plane-parallel, as shown, and it is possible to fabricate a transistor by providing the above-described alloyed regions on such opposed surfaces. However, in producing transistors especially adapted for high-frequency use, I prefer first to reduce the thickness of the body 8 to a small value in the region in which the junctions are to be formed, as shown in Figure 2B. Such opposed depressions may be formed by the method described in the above-cited Tiley and Williams application, and in fact may conveniently be formed by the same apparatus shown in Figure 1, by throwing the switch arm 32 to its lower position so as to produce electrolytic etching. However, in general, for complete versatility in producing various shapes and configurations of the semiconductive body, a separate jet-etching system may be employed to prefabricate the body 8 in the preferred shape.

Figure 2D:
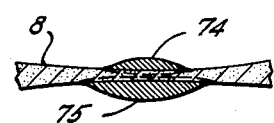

In any event, the body 8 of Figure 2B, containing the pair of opposed depressions 70 and 71, is inserted between nozzles 10 and 11, and, preferably, both radiant heaters 50 and 60 and the electrolyte-warming heaters 40 and 41 are turned on, to heat the electrolyte and the semiconductor to the desired temperature. During this period, the switch 28 may be maintained in its open position, so that no electrolytic current is passed and no electrodeposition occurs. After the electrolyte and semiconductive body have reached their proper temperatures, switch arm 32 is thrown to its upper position, and the metallic deposits 74 and 75 begin to form upon opposite surfaces of depressions 70 and 71, respectively, simultaneously beginning to alloy slightly with the underlying semiconductive material, as shown by the regions enclosed in the dashed lines in Figure 2C. As the process is continued, the sizes of the deposits tend to increase, as does the degree of penetration of the alloy regions, as shown in Figure 2D. When the alloyed regions have approached each other closely, but have not yet touched, as shown in Figure 2D, the electrolytic current and the application of the jets may be terminated. However, as pointed out above, in the event that the time required for deposition of the desired quantity of metal does not correspond with the time desired for alloying, the application of the jet and of the electrolyte may be terminated at different times.

The device of Figure 2D may then be utilized as a transistor by making appropriate contact to the body portion 8, and to each of the metal deposits 74 and 75 in a manner well known in the art.

It will be understood that where only a single rectifying diode is desired, only one side of the body need be subjected to the treatment above described to produce a P–N junction of excellent rectifying characteristics.

By way of an example only, the electrolyte may comprise a solution formed by dissolving 4.1 grams of indium trichloride and 2 grams of ammonium chloride in 150 cubic centimeters of ethylene glycol. During electrodeposition, this electrolyte may be maintained at a temperature of about 180°, which is well above the melting point of indium, which is about 156° C., but below the decomposition temperature of the ethylene glycol, which is about 197° C. Other temperatures within the range 156°–197° C. may also be used successfully. Ammonium chloride may be added to the solution prior to heating, to obtain a conductivity suitable for passage of the desired electrolytic current. Under these conditions, the metal deposited in molten form is indium which, when applied to an N-type body of semiconductive material, produces a P–N junction therein after cooling and recrystallization.

In a typical example in which the device fabricated is a P–N–P transistor, the body 8 is of N-type germanium having a 1,1,0 crystal-orientation, a minority-carrier lifetime of about 200 microseconds, a resistivity of about 5 ohm-centimeters, and is impinged from each side by a jet of electrolyte of about 15 mils diameter. An electrolytic current is then passed between the electrolyte and body in the plating direction for about 15 seconds, after which the current is discontinued by opening the switch 28 while the hot jets are allowed to play upon the semiconductive surface and the surface of the deposited metal for another two minutes. In this manner, a pair of opposed junctions having spacings of less than about 0.2 mil are produced in the semiconductive material, where the thickness of the original semiconductive material between the bottoms of the two opposed depressions was initially of the order of 0.3 mil. Upon the termination of the jet treatment, the body is cooled, as by removing it completely from the apparatus or by turning off the several heaters.

Other metals having suitably low melting points, such as gallium or cesium, and any of a number of intermetallic compounds such as indium cadmium, may also be deposited in this manner. Utilizing a solvent of higher decomposition temperature, such as glycerol which decomposes at about 290° C., metals of higher melting points, such as bismuth, may also be deposited.

Although the invention has been described with particular reference to specific embodiments thereof, it will be understood that it is susceptible of being practiced in a variety of other ways without departing from the scope thereof.

I claim:

1. A method for producing an accurately-located, localized junction between two regions of semiconductive material of different conductivities, comprising directing against a portion of a body of semiconductive material a jet of an electrolyte containing ions of a metal which, when alloyed with said semiconductive material, modifies the conductivity thereof, while passing an electric current between said body portion and said jet in a direction to effect electrodeposition of said metal ions upon said body portion, simultaneously maintaining the temperature of said jet, at the point of its impingement upon said body, above the eutectic temperature for said metal and said semiconductive material whereby said metal is deposited in molten form and alloys immediately with said semiconductive material, and subsequently cooling said body portion below said eutectic temperature to form a recrystallized region of said semiconductive material which is of altered conductivity.

2. The method of fabricating a rectifying junction of preselected location in a body of semiconductive material, comprising: directing against a portion of a body of semiconductive material of a first conductivity type, a jet of an electrolyte containing ions of a metal which, when alloyed with said semiconductive body, tends to convert said material to a conductivity type opposite to said first conductivity type; simultaneously passing an electric current between said jet and said body portion in a direction to produce electrodeposition of said metal ions upon said body in said preselected location; maintaining the interface between said jet and said body at a temperature above the eutectic temperature for said material and said metal, during said electrodeposition whereby said metal deposits in molten form on said body portion and forms a molten alloy immediately with said semiconductive material, and subsequently cooling said interface to solidify said molten alloy.

3. A method in accordance with claim 2, in which said interface temperature is maintained above the melting point of said metal during said electrodeposition.

4. A method in accordance with claim 2, comprising also the step of heating said semiconductive body to substantially said eutectic temperature.

5. A method in accordance with claim 2, comprising also the steps of terminating said application of said electric current, and continuing the application of said jet, after said termination of said electric current.

6. A method in accordance with claim 2, in which said directing of said jet against said body comprises applying to a germanium body a jet of an electrolyte containing ethylene glycol and ions of indium.

7. A method in accordance with claim 6, in which said interface temperature is maintained between about 156° C. and 197° C. during said deposition of said metal.

References Cited in the file of this patent

UNITED STATES PATENTS

| | | |
|---|---|---|
| 2,644,852 | Dunlap | July 7, 1953 |
| 2,709,154 | Hansgirg | May 24, 1955 |
| 2,767,137 | Evers | Oct. 16, 1956 |
| 2,818,374 | Certa et al. | Dec. 31, 1957 |

OTHER REFERENCES

Proc. of the I.R.E., volume 41, No. 12, December 1953, pages 1706–1708 cited (Tiley et al.).